United States Patent

Onn et al.

Patent Number: 5,729,703
Date of Patent: Mar. 17, 1998

[54] BUS CONTROL OPERATING SYSTEM HAVING BI-DIRECTIONAL ADDRESS LINES, INTEGRATED ONTO SAME CHIP AS MAIN CONTROLLER

[75] Inventors: Yong-ho Onn, Seoul; Wook Koh, Suweon, both of Rep. of Korea

[73] Assignee: Samsung Electronics Co., Ltd., Suwon, Rep. of Korea

[21] Appl. No.: 638,867

[22] Filed: Apr. 29, 1996

Related U.S. Application Data

[63] Continuation of Ser. No. 394,200, Feb. 24, 1995, abandoned, which is a continuation of Ser. No. 812,033, Dec. 23, 1991, abandoned.

[30] Foreign Application Priority Data

Sep. 20, 1991 [KR] Rep. of Korea .................. 91-16509

[51] Int. Cl.$^6$ .................................................. G06F 13/40
[52] U.S. Cl. ................................. 395/306; 395/308
[58] Field of Search ........................... 395/306, 308

[56] References Cited

U.S. PATENT DOCUMENTS

| | | | |
|---|---|---|---|
| 4,181,178 | 1/1980 | Suzuki et al. | 395/425 |
| 4,417,304 | 11/1983 | Dinwiddie, Jr. | 395/425 |
| 4,458,313 | 7/1984 | Suzuki et al. | 395/425 |
| 4,479,178 | 10/1984 | Schabowski | 395/325 |
| 4,631,659 | 12/1986 | Hayn, II et al. | 395/325 |
| 4,682,285 | 7/1987 | Ozil et al. | 395/275 |
| 4,811,202 | 3/1989 | Schabowski | 395/325 |
| 4,853,848 | 8/1989 | Mitsuhashi et al. | 395/425 |
| 4,910,657 | 3/1990 | Yoshida | 395/375 |
| 4,935,868 | 6/1990 | Dulac | 395/325 |
| 5,095,485 | 3/1992 | Sato | 371/51.1 |

*Primary Examiner*—Krisna Lim
*Attorney, Agent, or Firm*—Cushman Darby & Cushman IP Group of Pillsbury Madison & Sutro LLP

[57] ABSTRACT

A bus control operating system integrated in one chip with a main controller, which employs some of address bus lines operated in bi-directional mode, by interchanging signals between the main controller and the address source. As a result, if an external address source has to utilize address bus and data bus, an additional bus line for the external address source is not required and an additional external bus controller does not need to be manufactured.

8 Claims, 3 Drawing Sheets

BUS CONTROL OPERATING SYSTEM HAVING BI-DIRECTIONAL ADDRESS LINES, INTEGRATED ONTO SAME CHIP AS MAIN CONTROLLER

This is a continuation of application Ser. No. 08/394,200, filed on Feb. 24, 1995 now abandoned; which was a continuation of application Ser. No. 07/812,033, filed Dec. 23, 1991; which was abandoned upon the filing hereof.

BACKGROUND OF THE INVENTION

1. Field of the Invention

The present invention relates to a bus controller operating system, and more particulary to a bus controller operating system having bi-directinal address bus lines which are integrated within a main controller, without an external bus controller to be used for an external address source in case of using an address bus line and a data bus line.

2. Description of the Related Art

In general, a bus controller and a main controller have been respectively integrated in two separate chips.

FIG. 1 shows the operating system of the conventional bus controller. In FIG. 1, an address which is transmitted from an external address source (i.e, an external address device) is inputed to the bus controller or the main controller through a bus line, so that an address line must be provided on PCB and additional pins are also required to be mounted in on chip.

Recently, an embedded controller has been developed which has a plurality of bit lines that control a corresponding plurality of peripheral devices.

A conventional bus control system using an embeded controller has disadvantages of high product cost and complicated fabrication process complicated.

SUMMARY OF THE INVENTION

The present invention has been made in order to solve the problems as stated above. Its objective is to provide a bus controller operating system, integrated within a main controller and using a bi-directional operating bus line which need an additional bus line for receiving an address signal from an external address source.

To achieve said objective, according to the present invention, a bus controller operating system is provided which comprises a main controller(100); a bus controller (200) integrated in the main controller; an external address source(300); bi-directional address bus lines(400) for transformation mode by changing a signal direction the main controller and the external address source; uni-directional address bus lines(500); data bus lines(400); whereby one chip is capable of operating bus controller system without using an additional external bus controller.

BRIEF DESCRIPTION OF THE DRAWING

The above object and feature of the present invention will be apparent from the following description of the preferred embodiment with reference to the attached drawings.

DESCRIPTION OF THE PREFERRED EMBODIMENTS

The invention will be more specifically described with reference to the accompanying drawings.

Figure 2:
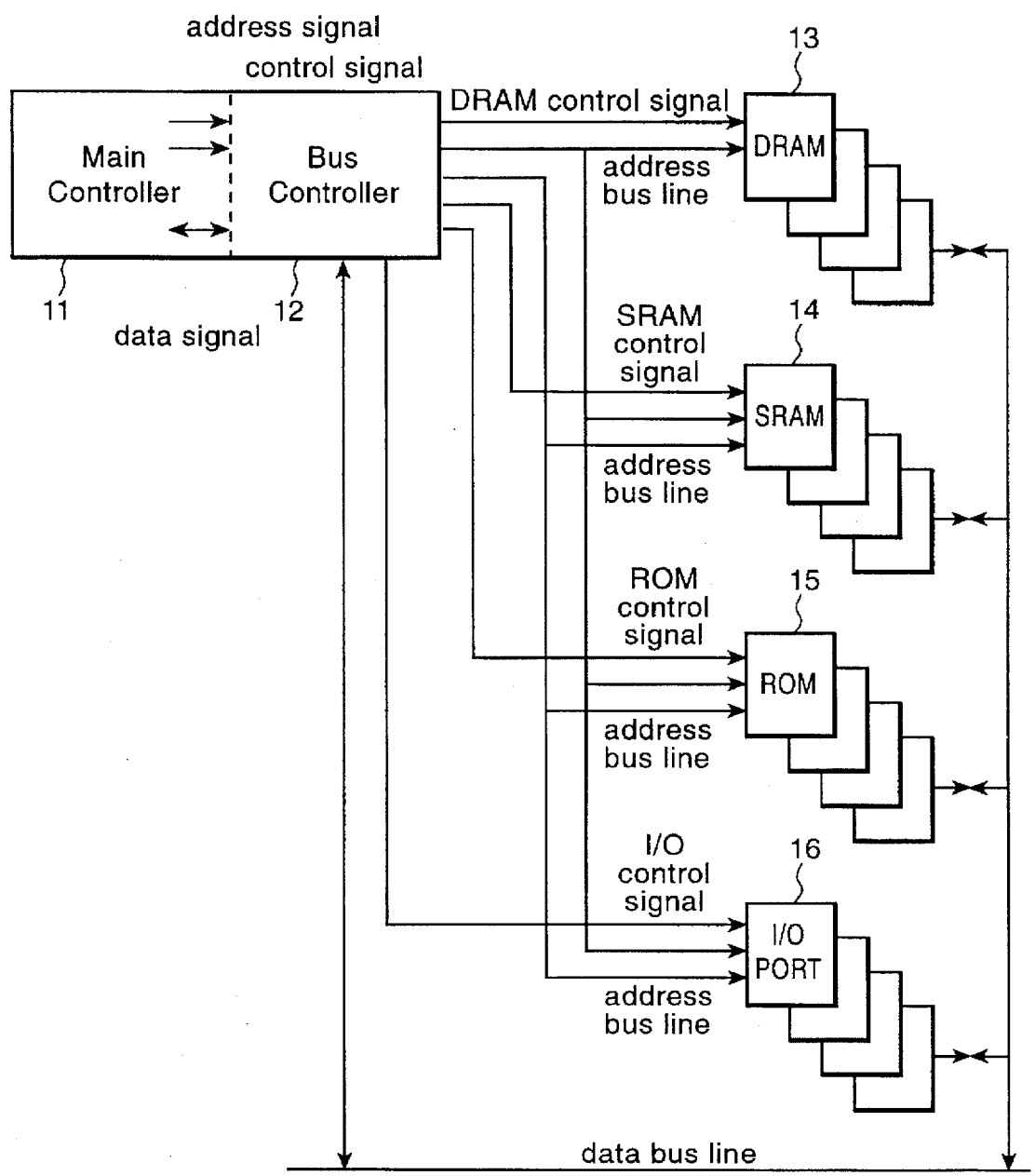
FIG. 2 is a schematic block diagram illustrating a bus controller operating system which does not use an address source according to one embodiment of the present invention.

FIG. 2 is a schematically block diagram illustrating a bus controller operating system which does not an external address source, according to one embodiment of the present invention. Referring now to FIG. 2, all address and data signals are controlled by the bus controller(12) integrated within the main controller(11). Because the address source (not illustrated here) is positioned within the chip, the address signal transmitted from the address source is supplied to a target device, such as a DRAM(13), an SRAM (14), ROM(15), and an I/O PORT(16). Some bits of the address bus line are only directed to the SRAM(14), the ROM(15), and the I/O PORT(16). Each control signal is respectively applied to the target device.

Figure 1:
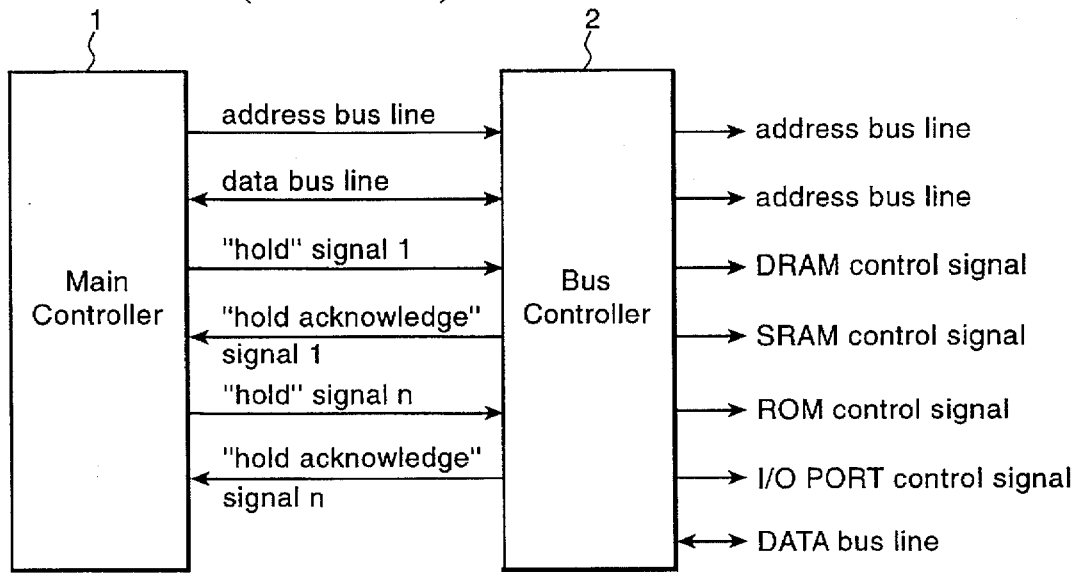
FIG. 1 is a schematic block diagram illustrating a conventional bus controller operating system.
Figure 3:
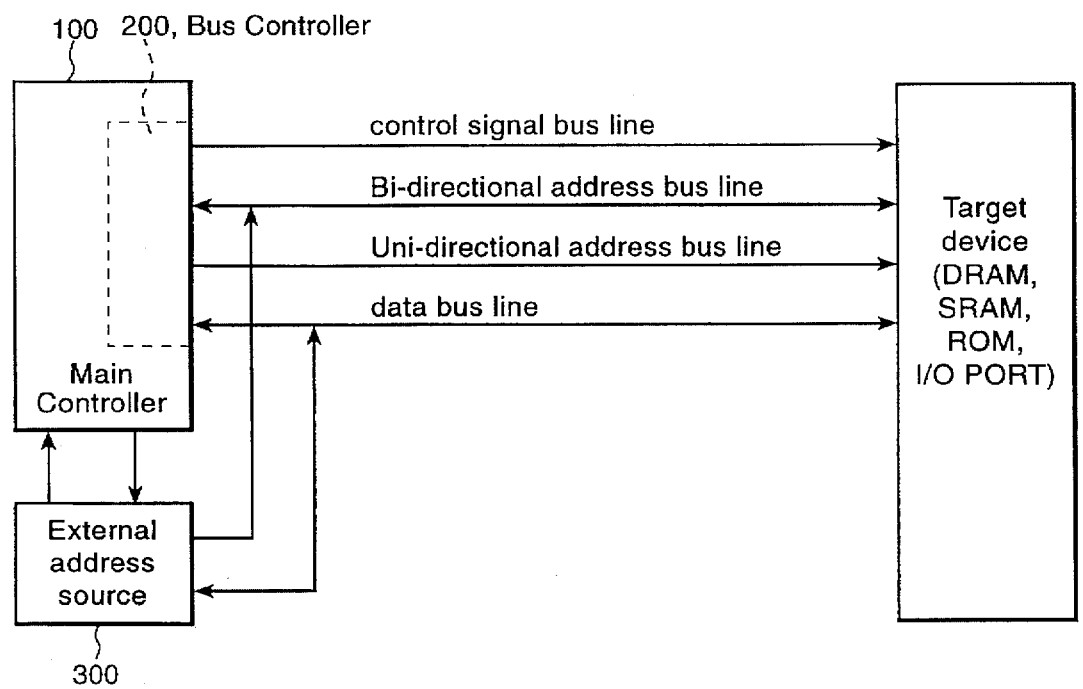
FIG. 3 is a schematic block diagram illustrating a operating system in case that the external address source uses the address bus and the data bus, according to another embodiment of the present invention.

FIG. 3 is a schematically block diagram illustrating a bus controller operating system where the external address source have to use the address bus, and the data bus according to another embodiment of the present invention.

In FIG. 3, if the external address source is subjected to use the address bus lines and the data bus lines, the external address source transmits a signal "HOLD" into the main controller(100). A bus arbitor (not shown) in the main controller(100) receives the "HOLD" signal, and then transmits a "HOLD ACK" signal.

Thus, a portion of the address bus line operated in bi-directional mode (i.e., the portion of address bus line transmits signals in opposite directions). The external address source(300) is connected to the bi-directional address bus lines in order to use the address bus line. Afterwards, the bus controller(200) integrated within main controller(100) is freed from instructions from the main controller, whereby it only operates in responding to the external address source(300). As a result, the bus controller (200) receives an address signal transmitted from the external address source and(300) decodes the address, thereby transmitting a signal, such as "R/W", "CAS", "RAS" and "CE", etc., to, for example, memory or the I/O port.

Figure 4:
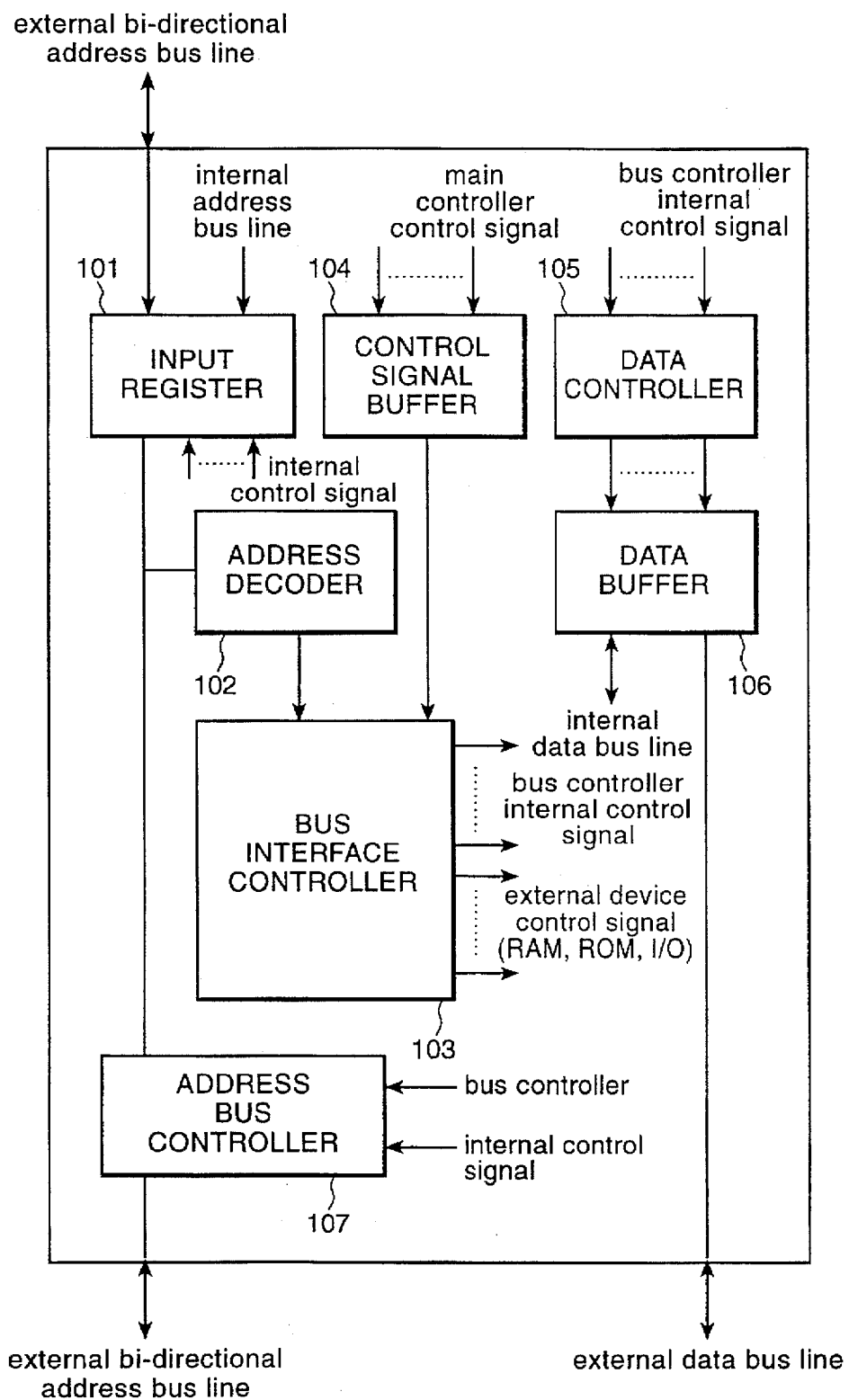
FIG. 4 is a block diagram explaining the operation of a bus controller integrated within a main controller, according to the present invention.

FIG. 4 is a block diagram explaining the operation of the bus controller integrated within a main controller, according to the present invention. As shown in FIG. 4, signals are input to the bus controller through the bi-directional address bus line and the internal address bus line.

The address signals which are input through the bi-directional address bus line is stored in a register "A" and a register "B" (neither shown).

The data stored in the register "B" is converted into a form required by the target device, while the address stored in register "A" is transmitted to an address decodes(102). The address decoder(102) decodes the address signal in order to designate the target device for the address, such as "DRAM", "SRAM", "ROM" and "I/O PORT." A control signal buffer(104) receives a internal control signal transmitted from the main controller.

The decoded signal is transmitted to a bus interface controller(103). The bus interface controller(103) receives the decoded signal and the internal control signal from the control signal buffer(104), and transmits the control signal to the target device, such as DRAM, SRAM, ROM, and I/O. In this case, if the address signal corresponds to the DRAM, LATCH and COMPARATOR(not shown) generate a signal for controlling address transformation for a row address and a column address.

An address bus controller(107) receives an address signal transmitted from the input register(101) and an internal control signal transmitted from the bus interface controller (103) in order to properly control the address signal, and transmit the address signal to the target device through the bi-directional address bus line. A data controller(105) receives the internal control signal and transmits it to a data buffer(106). The data buffer(106) receives the internal control signal transmitted from the bus interface controller(103) and receives/transmits the data signals through a internal data bus and an external data bus.

As mentioned above, according to the present invention, an operating system of the bus controller is provided being capable of unemploying a address bus line to be needed in receiving an address signal generated from the external address source and transmitting the decoded signal thereof.

As a result, manufacturing cost can be reduced and the manufacturing process can be simplified. The invention is in no way limited to the embodiment described hereinabove. Various modifications of disclosed embodiment as well as other embodiments of the invention will become apparent to persons skilled in the art upon reference to the description of the invention. It is therefore comtemplated that the appended claims will cover any modifications or embodiments as fall within the true scope of the invention.

What is claimed is:

1. A bus controller operating system comprising:

a main controller;

a bus controller integrated on a single integrated circuit chip with said main controller;

an external address source;

an external target device;

a bi-directional address bus lines constructed and arranged to carry address signals from said bus controller to said external target device and external source address signals from said external address source to said bus controller;

an internal address bus connected between said main controller and said bus controller for carrying internal address signals; and internal data bus lines connected between said main controller and said bus controller for carrying data signals; wherein said bus controller comprises:

an input register for storing one of said external address signals and said internal address signals received from at least one address source through one of said external bi-directional address bus lines connected to said external address source and said internal address bus;

an address decoder for decoding address signals transmitted from said input register and transmitting a decoded signals to designate the target device;

a control signal buffer for transmitting a second internal control signal in correspondence with a first internal control signal generated by said main controller;

a bus interface controller constructed and arranged to transmit a characteristic control signal to said at least one address source in correspondence with said second control signal transmitted from said control signal buffer and said decoded signal from said address decoder;

a data controller constructed and arranged to transmit a fourth control signal in correspondence with said characteristic control signal received from said bus interface controller;

a data buffer constructed and arranged to receive said fourth control signal transmitted by said data controller and receiving and transmitting data through said internal data bus lines and external data bus lines; and an address bus controller constructed and arranged to transmit said address signals to the target device through said bi-directional address bus line, after receiving a signal from said input register and said characteristic control signal transmitted from said bus interface controller.

2. A bus controller operating system comprising:

a main controller;

a bus controller integrated on a single integrated circuit chip with said main controller;

an external address source;

an external target device;

bi-directional address bus lines constructed and arranged to carry address signals from said bus controller to said external target device whereby an external address bus controller is not needed and external source address signals from said external address source to said bus controller;

an internal address bus connected between said main controller and said bus controller for carrying internal address signals; and internal data bus lines connected between said main controller and said bus controller for carrying data signals.

3. A bus controller operating system as claimed in claim 2, wherein said internal address bus is a uni-directional address bus.

4. A bus controller operating system as claimed in claim 3, wherein said internal data bus is a bi-directional address bus.

5. A bus controller operating system as claimed in claim 4, further including a bi-directional external data bus for carrying data signals bi-directionally between said external target device and said bus controller and bi-directionally between said external address source and said bus controller.

6. A bus controller operating system as claimed in claim 2, wherein said internal data bus is a bi-directional address bus.

7. A bus controller operating system as claimed in claim 6, further including a bi-directional external data bus for carrying data signals bi-directionally between said external target device and said bus controller and bi-directionally between said external address source and said bus controller.

8. A bus controller operating system as claimed in claim 2, further including a bi-directional external data bus for carrying data signals bi-directionally between said external target device and said bus controller and bi-directionally between said external address source and said bus controller.

* * * * *